A. SEARLS.

Whip Socket.

No. 9,424. Reissued Oct. 19, 1880.

Witnesses:

Henry Eichhings

A. S. Fitch.

Inventor:

Amos Searls

By J. P. Fitch

Atty.

N. PETERS, PHOTO-LITHOGRAPHER, WASHINGTON, D. C.

UNITED STATES PATENT OFFICE.

ANSON SEARLS, OF NEWARK, NEW JERSEY.

WHIP-SOCKET.

SPECIFICATION forming part of Reissued Letters Patent No. 9,424, dated October 19, 1880.

Original No. 147,985, dated February 24, 1874. Application for reissue filed March 4, 1880.

*To all whom it may concern:*

Be it known that I, ANSON SEARLS, of Newark, in the county of Essex and State of New Jersey, have invented certain new and useful Improvements in Whip Sockets and Fasteners; and I do hereby declare that the following is a full, clear, and exact description thereof, reference being had to the accompanying drawings, and to the letters of reference marked thereon, which form a part of this specification.

The nature of my invention consists in the construction and arrangement of a whip-socket, as will be hereinafter more fully set forth.

In order to enable others skilled in the art to which my invention appertains to make and use the same, I will proceed to describe its construction and operation, referring to the annexed drawings, in which—

Figure 1:
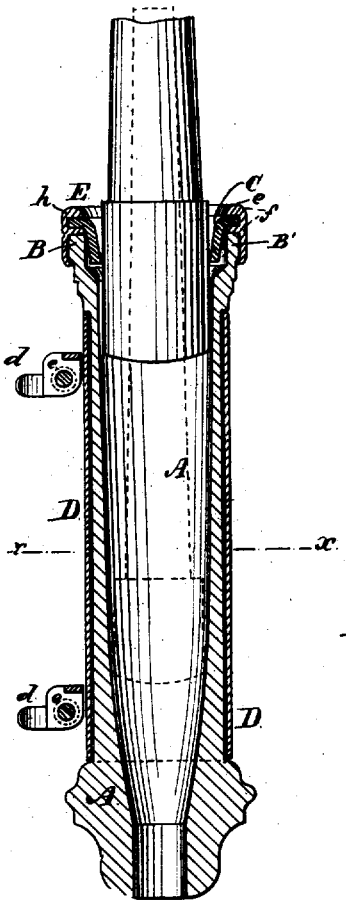
Figure 2:
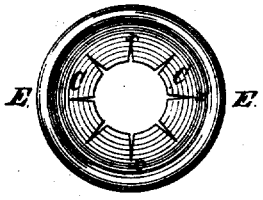
Figure 3:
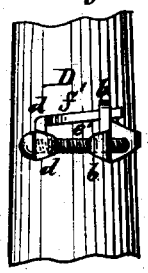
Figure 4:
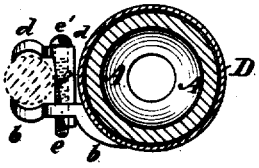
Figure 5:
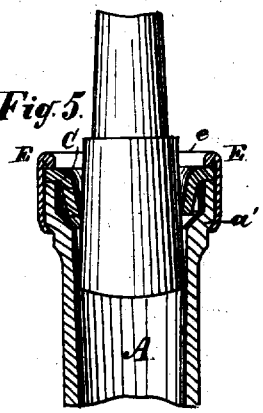

Figure 1 is a vertical section. Fig. 2 is a plan view of diaphragm C. Fig. 3 is a detail view of jaws *b* and *d;* and Fig. 4 is a horizontal section on line *x x*, Fig. 1. Fig. 5 illustrates a modification of the top portion of my invention.

A represents a tubular whip-socket, made all or in part of wood or other suitable material, and provided with a bell-shaped or enlarged top, and with a flat rubber or elastic ring or perforated diaphragm, C, which is held in an annular space, *f*, near the upper edge or rim of the said top. The enlarged interior diameter of the said top above and below the said diaphragm, relatively to the diameter of the barrel or body of the socket, may be proportioned to the thickness of the said ring or diaphragm.

As illustrated in the drawings, the body of the socket may be about one and one-eighth inch internal diameter, and the internal diameter of said top about one and three-eighths of an inch, and the said enlargement about three-eighths of an inch in vertical depth. The diaphragm should be about one-eighth of an inch thick.

The annular space or groove *f*, in which the diaphragm is held, may be formed by a cap, E, which may be made of sheet metal, with the edge spun over and down, so as to form the upper open rim, *e*, of said top, the lower side of which will form the upper wall of said annular space *f*, between which and the opposite or lower side or wall of said space the diaphragm is to be tightly clamped. The bottom of said cap may extend down upon the exterior of the socket and the lower edge be turned under the projection at *a'*, Fig. 5, formed by the enlargement of the top, which is a cheaper mode of construction than screw-threads or rivets. The upper edge of the body of the top B may constitute the lower wall of said annular space or groove *f*, as in Fig. 5; or the said wall may be formed by a flange projecting inward from the cylindrical part of the cap E, as shown in Fig. 1, or in any suitable equivalent manner.

When the whip is inserted the diaphragm C is borne down and outward into the annular space in the enlarged top around the whip, as shown in Figs. 1 and 5, whereby the whip passes freely into the socket. Any whip that will go into the body of the socket will thus pass freely through the diaphragm. And so, also, the rim *e* of the said top above the diaphragm being larger in diameter than the body of the socket by about twice the thickness of the diaphragm, when the whip is withdrawn the diaphragm will be bent upward and outward into the space between the whip and the rim, thus permitting the free movement out of a whip-stock about as large in diameter as the interior of the body of the socket.

It will be seen that if the rubber were made one-quarter of an inch thick and the enlargement in the top B one and five-eighths in diameter, the enlargement would have to be half an inch deep to allow the rubber room to turn down enough to admit the whip into the socket A. Hence the enlargement in B forms room for the rubber C to turn into when the whip is inserted. The approximate size should be twice the thickness of the rubber larger than the barrel A, and in depth at least the depth of the rubber when turned down. The rim *e* above the rubber C, being also enlarged correspondingly with the enlargement B, in withdrawing the whip the rubber turns up and expands freely in the same manner to let the whip out.

The rubber diaphragm used in this class of whip-sockets may be made in diameter equal to the diameter of the annular space or groove *f*, and about one-eighth or three-sixteenths of an inch thick, its thickness only depending upon the diameter of the chamber B and rim *f*—for the larger the chamber the thicker the rubber may be made, until a thickness is arrived at sufficient to withstand any wear or injury it may be subjected to.

In the inner edge of the rubber C may be slits *x x*, that open when the whip is inserted, thereby reducing the strain on the rubber and whip when a very large whip is inserted. The slits should be about one-quarter of an inch deep in ordinary-sized rubbers, and a little deeper in heavy rubbers, but should not extend through.

The bottom of the tubular socket A may be made in the form of an inverted cone internally, this conical form extending about two inches, more or less, from the bottom upward, so as to obtain a gradual internal slope to the sides.

For obvious reasons the diameter of the lower end of the said conical chamber should not be greater than the smallest whip-stock butt in practical use.

The rubber disk C, as before in substance stated, is to have its central opening small enough to grasp the smallest-size whip-stock that may be placed in the socket, and yet the flexible and elastic nature of the rubber will admit of the insertion of a stock of the full diameter of the interior of the body of the socket. By the joint action, therefore, of these two devices—the conical chamber and the india-rubber disk C—whip-stocks of widely varying sizes may be inserted into the socket and withdrawn therefrom easily and conveniently, and without liability to being marked, and when in the socket will be held securely centrally therein.

The taper of the conical part of the socket should begin not much, if any, above the middle of the length of the socket, in order to best accomplish the purpose, for if the taper should begin much farther up the slope of the sides would be so gradual that the whip would be apt to stick or wedge in and split the socket.

The wood socket A, after being bored out, may be turned down thin and light from the outside. A sheet-metal band, D, is then secured around it, reaching, preferably, from the top finish to the bottom finish, surrounding the main wood barrel of the socket, and thereby strengthening the same, so that it will not be likely to split or be injured by any use for which it is intended. The fastenings for attaching the socket to the vehicle may then be readily attached to the metal band D. The said fastenings consist of a jaw, *b*, secured firmly to the socket, and a jaw, *d*, having an arm, *f′*, that projects down through *b*, and a screw, *e′*, passing through the said jaws, whereby they are clamped upon the dash-rail of the vehicle.

Having thus fully described my invention, what I claim as new, and desire to secure by Letters Patent, is—

1. A whip-socket provided with an elastic flexible diaphragm, C, held in an annular space or groove, *f*, near the upper open end of the socket, and an enlargement, B, immediately below the said diaphragm, as and for the purpose specified.

2. A whip-socket provided with an elastic flexible diaphragm held in an annular space or groove, *f*, near the upper open end of the socket, and a rim, *e*, above said diaphragm of greater internal diameter than the main body or barrel of the socket, as and for the purpose described.

3. The socket A, provided with an enlarged chamber at the top of the socket described, in combination with the disk C, and a suitable fastening-cap, E, formed and secured to the socket substantially as specified.

4. A wooden whip-socket provided with the metal band D, as and for the purpose set forth.

5. In combination with a whip-socket, jaws *b d*, screw *e′*, and arm *f′*, all constructed substantially as set forth.

In testimony that I claim the foregoing as my own I affix my signature in the presence of two witnesses.

ANSON SEARLS.

Witnesses:
J. P. FITCH,
M. F. CLIFTON.